April 27, 1943.   A. TOWNHILL   2,317,827
QUICK DISCONNECT COUPLING
Filed Jan. 9, 1942   2 Sheets-Sheet 1
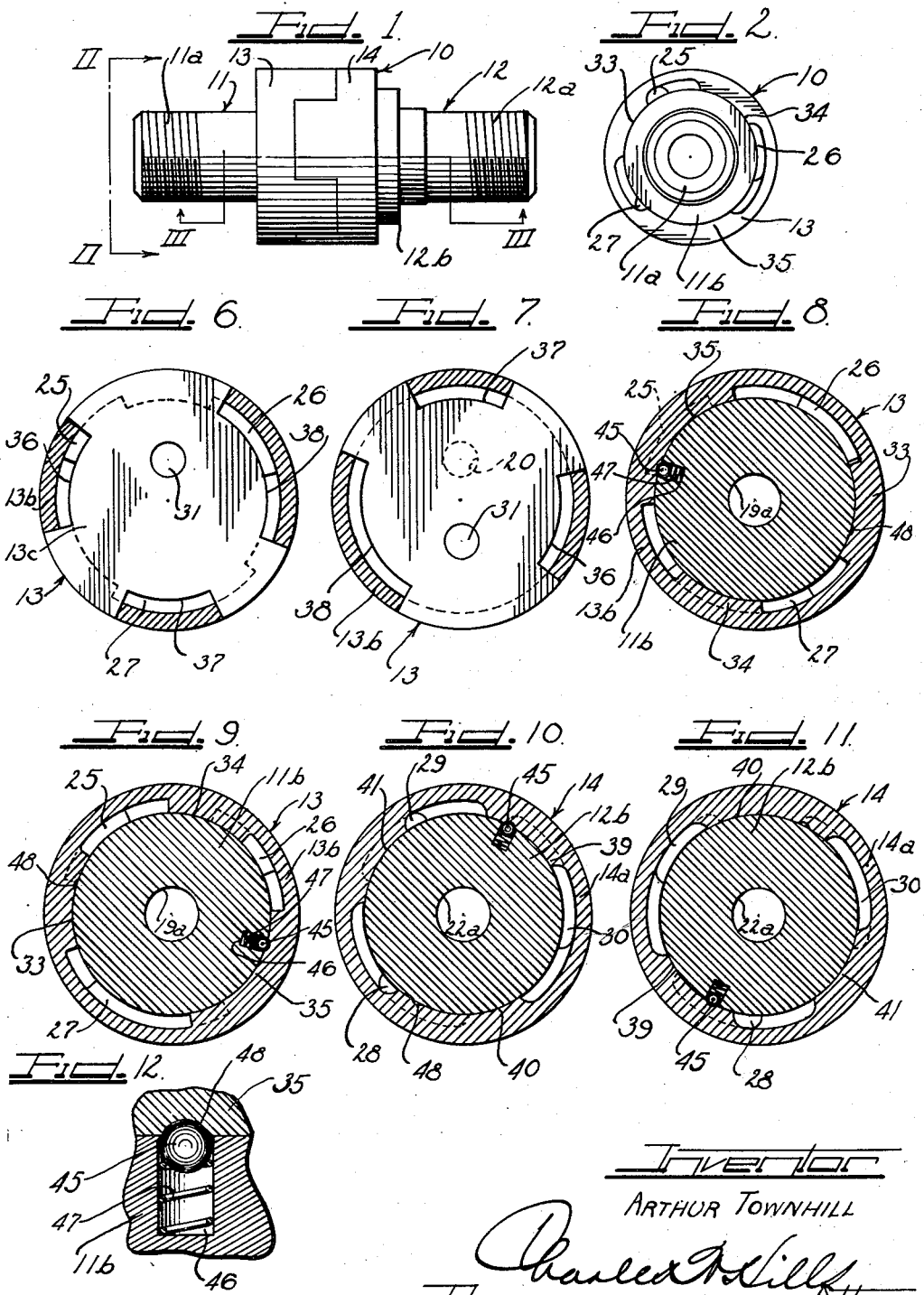

April 27, 1943.  A. TOWNHILL  2,317,827

QUICK DISCONNECT COUPLING

Filed Jan. 9, 1942  2 Sheets-Sheet 2

Inventor
ARTHUR TOWNHILL

Patented Apr. 27, 1943

2,317,827

UNITED STATES PATENT OFFICE 2,317,827

QUICK DISCONNECT COUPLING

Arthur Townhill, Cleveland, Ohio, assignor to Thompson Products Incorporated, Cleveland, Ohio, a corporation of Ohio Application January 9, 1942, Serial No. 426,137

10 Claims. (Cl. 284—18)

This invention relates to couplings which automatically seal the ends of conduits when the coupling is broken and which automatically join the conduits in fluid flow communication when the coupling is connected.

More specifically the invention relates to a coupling including a pair of passaged nipples for fixed attachment to conduit ends together with a pair of mating sleeves rotatably mounted on the nipples and having locking instrumentalities for joining the nipples in fluid flow communication as well as shield walls for sealing the ends of the nipple passages whenever the sleeves are rotated to disconnect the nipples.

In accordance with this invention a pair of hollow nipples having enlarged headed ends are equipped with circumferentially spaced outturned flanges or lugs around the heads thereof. A cup-shaped member or sleeve is adapted to be slipped over the head of each nipple and has inturned flanges or lugs adapted to fit between the outturned flanges of the nipples so as to extend beyond the nipple flanges. Upon relative rotation between the sleeves and nipples the cooperating flanges can be brought into overlapping relation for holding the sleeves on the nipples. Each sleeve has an apertured shield or wall fitting over the end face of the nipple on which it is mounted to cover the passage through the nipple whenever the aperture in the wall is rotated out of alignment with the passage.

One of the sleeves has circumferentially spaced longitudinally projecting fingers with inturned flanged ends. The other of the sleeves has circumferentially spaced recesses adapted to receive these fingers. The inturned flanged ends of the fingers are adapted to engage the outturned flanges of the nipple on which the recessed sleeve is mounted to lock the parts together upon relative rotation of the sleeves and nipples since the flanges, upon such rotation, will be moved into the recesses. Whenever the sleeves are thus rotated to couple the nipples together the apertures in the shield walls thereof are brought into alignment with the passages in the nipples so as to place the nipples in fluid flow communication.

Whenever the sleeves are rotated to uncouple the nipples the apertures in the shield walls thereof are moved out of alignment with the passages in the nipples so that the shield walls will seal these passages and prevent leakage out of any conduits to which the nipples are connected.

The couplings of this invention are thus actuated by a simple rotation of interfitting sleeve members. This rotation of the sleeve members automatically seals and unseals conduit ends to which the coupling parts are connected.

The couplings of this invention are especially useful as quick disconnect means for conduit ends as, for examples, in airplane motor installations wherein the various fuel, lubricant, and coolant lines from the supply sources are joined with the motor. If these lines are equipped with the quick disconnect couplings according to this invention, the airplane motor can be speedily removed from the aircraft and replaced with a serviced or new motor without any loss of fuel, lubricant, or coolant from either the supply tank or the motor.

It is, then, an object of this invention to provide a coupling which automatically joins conduit ends in fluid flow communication and automatically seals the conduits ends when the coupling is broken.

A further object of the invention is to provide a quick disconnect coupling operative to alternately join conduits in fluid flow communication and disconnect the conduits in sealed condition upon a mere rotation of sleeves provided on the coupling.

A still further object of the invention is to provide a coupling composed of complementary nipples and sleeves which only can be placed together in proper relation.

A still further object of this invention is to provide a coupling composed of a pair of nipple members and a pair of mating interfitting sleeves rotatably carried by the nipple members and adapted to interlock the nipple members together in one position thereof as well as to seal the nipple members in separated position.

A still further object of this invention is to provide a coupling having a pair of passaged nipples for attachment to conduit ends with shield-like coupling sleeves operative to connect the nipples together as well as to seal the passages in the nipples.

A still further object of the invention is to provide a quick disconnect coupling with complementary outturned and inturned flanges adapted to interlock for joining the coupling parts together.

Other and further objects of the invention will be apparent to those skilled in the art from the following detailed description of the annexed sheets of drawings which, by way of preferred example, illustrate one embodiment of the invention.

On the drawings:

Figure 1 is a side elevational view of a coupling according to this invention.

Figure 2 is an end elevational view of the coupling shown in Figure 1, taken along the plane II—II of Figure 1.

Figure 3 is an enlarged longitudinal cross-sectional view, with parts in elevation, taken along the line III—III of Figure 1.

Figure 4 is a view similar to Figure 3 but illustrating the coupling parts in disconnected conduit-sealing position.

Figure 5 is an exploded longitudinal cross-sectional view, with parts in elevation, of the elements making up the coupling of Figures 1 to 4.

Figure 5a is a view taken along the line Va—Va of Figure 5.

Figure 5b is a view taken along the line Vb—Vb of Figure 5.

Figure 5c is a view taken along the line Vc—Vc of Figure 5.

Figure 5d is a view taken along the line Vd—Vd of Figure 5.

Figure 5e is a view taken along the line Ve—Ve of Figure 5.

Figure 6 is a transverse cross-sectional view, taken along the line VI—VI of Figure 3.

Figure 7 is a transverse cross-sectional view, taken along the line VII—VII of Figure 4.

Figure 8 is a transverse cross-sectional view, taken along the line VIII—VIII of Figure 3.

Figure 9 is a transverse cross-sectional view, taken along the line IX—IX of Figure 4.

Figure 10 is a transverse cross-sectional view, taken along the line X—X of Figure 3.

Figure 11 is a transverse cross-sectional view, taken along the line XI—XI of Figure 4.

Figure 12 is an enlarged fragmentary cross-sectional view, with parts in elevation, illustrating a spring-pressed detent adapted to hold the coupling sleeve in fixed position on a nipple of the coupling.

As shown on the drawings:

In Figures 1 to 5 inclusive the coupling 10 includes a pair of nipple members 11 and 12 and a pair of coupling sleeves 13 and 14. The nipple member 11 has a threaded shank portion 11a and an enlarged cylindrical head 11b. The nipple member 12 likewise has a threaded shank portion 12a and an enlarged cylindrical head 12b. The sleeve 13 is rotatably mounted on the head 11b. The sleeve 14 is rotatably mounted on the head 12b.

As shown in Figures 3 and 4, a conduit 15 has a coupling nut 16 rotatably mounted on the end thereof and threaded onto the nipple shank 11a. A second conduit 17 has a coupling nut 18 rotatably mounted on the end thereof and threaded on the nipple shank 12a. In this manner the ends of fluid flow conduits are connected to the respective nipple members 11 and 12 of the coupling.

The nipple 11 has an axial bore 19 through the shank 11a thereof and extending into the head 11b. The bore 19 has a sloping end portion 19a through the head 11b of the nipple terminating in a cylindrical port 20 at the end face 11c of the nipple. This end face 11c can be countersunk to receive a resilient gasket or sealing ring 21.

The nipple 12 has a similar axial passageway 22 through the shank 12a thereof merging with a sloping passageway 22a in the head 12b thereof and terminating in a cylindrical port 23 at the face 12c of the nipple. This face 12c can be countersunk around the port 23 to receive a resilient gasket or sealing ring 24.

As best shown in Figures 5 and 5a, the nipple 11 has three radially extending flanges 25, 26 and 27 in circumferentially spaced relation therearound. The flange 27 continues through a longer arc than the flanges 25 and 26 and may conveniently be referred to as the "wide" flange.

As shown in Figures 5 and 5e, the nipple 12 has similar flanges 28, 29 and 30 with the flange 28 being the "wide" flange.

As best shown in Figures 5 and 5b, the coupling sleeve 13 for the nipple 11 has a shield face 13a for covering the face 11c of the nipple head 11b. This shield 13a has a port opening 31 therethrough adapted to register with the port 20 of the nipple and also adapted to be rotated out of alignment with the port. The outer face of the shield wall 13a can be counterbored to receive a resilient gasket or sealing ring 32 around the port 31.

The coupling sleeve 13 has a cylindrical wall 13b adapted to ride on the cylindrical head 11b. This wall 13b is provided with three circumferentially spaced inturned flanges 33, 34 and 35 adapted to fit in the spaces between the flanges 25, 26 and 27 of the nipple head 11b to permit the sleeve to be slipped onto the coupling head. Upon rotation of the sleeve after it is seated on the coupling head the flanges 33 to 35 will be moved back of the flanges 25 to 27 thereby holding the coupling sleeve on the nipple head.

Thus, as better illustrated in Figure 2, the sleeve 13 can be slipped over the nipple head 11b by positioning the flanges 33 to 35 thereof so that the same fit in the spaces between the flanges 25 to 27 of the nipple head. A rotation of the sleeve to the position shown in Figure 2 will thereupon move the flanges 33 to 35 partially over the flanges 25 to 27 and the thrusting relation between the nipple flanges and the sleeve flanges will hold the parts in assembled rotatable relation.

The wide flanges 27 and 35 are used so that the sleeve can only be mounted on the nipple head in the correct position to bring the port 31 in the shield face portion 13a thereof into alignment with the port of the other sleeve 14 as will be hereinafter described.

As shown in Figures 6 and 7, the sleeve member 13 has recesses 36, 37 and 38 cut in the end face 13c and cylindrical side wall 13b thereof. The recess 38 extends over a greater arcuate segment than the recesses 36 or 37, and may be termed the "wide" recess.

As shown in Figure 6, the recesses are circumferentially spaced around the face 13c of the sleeve member, for a purpose to be more fully hereinafter described.

The sleeve member 14, as shown in Figures 5 and 5d, has a transverse shield wall 14a for covering the face 12c of the nipple 12 and a cylindrical side wall 14b for disposal over the cylindrical head 12b of the nipple. This side wall 14d has inturned flanges 39, 40 and 41 in circumferentially spaced relation around the inside of the sleeve. The flanges are spaced so as to pass between the outturned flanges or lugs 28, 29 and 30 on the nipple head and are adapted to fit behind these flanges or lugs of the nipple head when the sleeve is rotated. The sleeve is thus rotatably mounted on the nipple 12.

The shield wall 14a of the sleeve has a port 31 similar to the port 31 of the shield wall 13a for registering therewith, adapted to register with the port 23 of the nipple. The face of the shield wall 14a can be counterbored to receive a gasket 32 around the port 31. The gasket 32 is preferably flush with the face of the shield wall.

The port 31 in the sleeve 14 is so positioned as to register with the port 31 in the sleeve 13 and to be moved into and out of alignment with the nipple port 23.

The sleeve 14 has three arcuate fingers 42, 43 and 44, as shown in Figures 5 and 5c projecting from the cylindrical wall 14b thereof on the opposite side of the shield wall 14a. These fingers 42, 43 and 44 are spaced circumferentially around the periphery of the sleeve and are adapted to fit in the recesses 36, 37 and 38 respectively of the sleeve 13. Thus the finger 44 is the "wide" finger and can only be seated in the "wide" recess 38 of the sleeve 13. Each of the fingers 42, 43 and 44 have inturned flanges or lugs 42a, 43a and 44a at their extremities for gripping the flanges 25, 26 and 27 respectively of the nipple head 11b.

Since the "wide" finger 44 can only fit in the wide recess 38, the ports 31 in the shield walls 13a and 14a are positioned in alignment as shown in Figure 3 whenever the coupling sleeves are seated together. The sleeves 13 and 14 thus interfit as shown in Figure 1, and rotation of the same relative to their nipples 11 and 12 will lock the nipples together since the lugs or flanges on the fingers will engage the lugs or flanges on the nipple head 11b. At the same time the ports 31 in the shield walls of the flanges will be moved into alignment with the ports 20 and 23 of the nipples thereby placing the nipples in full fluid flow communication as shown in Figure 3.

Rotation of the sleeve in the reverse direction will move the ports 31 out of alignment with the nipple ports 20 and 23 as shown in Figure 4. At the same time the lugs on the fingers will be moved into the spaces between the flanges on the nipple head 11b so that the parts can be separated. The shield walls 13a and 14a of the sleeve will block off the ports 20 and 23 and the gasket rings around these nipple ports will prevent leakage out of the nipple passageways. When the ports 31 are coupled together the gaskets 32 in the sleeve shield walls will prevent leakage between the sleeves. If desired one gasket 32 can be eliminated as shown in Figures 3 and 4, since the other gasket 32 carried in the shield wall 14a will resiliently engage the shield wall 13a to effect the seal between the walls.

As shown in Figures 8 and 9 when the sleeve 13 is rotated on the nipple head 11b the lugs or flanges 33, 34 and 35 on the sleeve will overlap the lugs or flanges 25, 26 and 27 on the nipple head 11b to retain the parts in assembled relation as the port 31 in the sleeve is being moved between open and closed position as shown in Figures 6 and 7. While the sleeve flanges or lugs may be moved across the spaces between the flanges on the nipple head, the interengaging flanges are so arranged that, during this movement, at least two flanges on the sleeve will always be in engagement with two flanges on the nipple head thereby holding the sleeve on the nipple head. While the sleeve can be initially slipped onto the nipple head through the spaces between the flanges on the head, rotation of the sleeve after it is assembled between open and closed position is in the reverse direction so that the assembly position is never used during the coupling and uncoupling operations.

A spring pressed ball 45 can be carried in a well 46 formed in the nipple head and urged by a spring 47 into pockets 48 formed in the flanges 33 and 35 respectively of the sleeve. The spring-pressed ball upon snapping into the pockets or recesses provided in these flanges will produce a click action to indicate to the operator that the sleeve is either in fully closed or fully opened position. The spring pressed ball at the same time prevents unauthorized rotation of the sleeve.

Likewise, as shown in Figures 10 and 11, a similar spring pressed ball 45 can be provided in the head 12b of the nipple 12 for operating into and out of pockets 48 in the flanges 39 and 40 of the sleeve 14.

The flanges or lugs 28, 29 and 30 of the nipple head 12b cooperate with the flanges 39, 40 and 41 of the sleeve 14 in a manner similar to that described in connection with the sleeve 13.

From the above descriptions it will be understood that the respective sleeves are readily mounted on the nipples by so positioning their flanges that they will fit through the spaces between the lugs or flanges on the nipple heads. However, rotation of the sleeves on the nipple heads from this assembly position will move the sleeve flanges back of the nipple head flanges to retain the sleeves on the nipple. Spring pressed balls will prevent rotation of the sleeve back to the assembly position and will also give the operator indication as to when the sleeves are in port-closing or port-opening position.

The fingers on the sleeve 14 are so arranged that they will only fit into the recesses of the sleeve 13 in one position. In this one position the ports 31 of the sleeves are always in alignment so that the sleeves cannot be coupled together without having their ports in alignment. The ports in the sleeves are eccentric to the ports in the nipples so that rotation of the sleeves will move the aligned sleeve ports into and out of alignment with the nipple ports. The eccentric relation of the sleeve ports and nipple ports is accomplished, in the illustrated embodiment of the invention, by off-center arrangements of the nipple ports. Obviously, the nipples could have straight axial bores therethrough, and could be provided with eccentric heads, giving the same results as the eccentrically disposed ports.

The coupling of this invention is thus readily assembled from the respective elements and is operated by partial rotation of interfitting sleeve members. These sleeve members not only serve to join the coupling parts together, but also serve as seals to close the respective coupling parts when the same are disconnected.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A coupling comprising a pair of longitudinally passaged parts arranged for attachment to the ends of conduits, a sleeve rotatably mounted on each part having a shield wall disposed across an end face of the part for sealing the passage in one position thereof and for uncovering the passage in another position thereof, and means on a sleeve for engaging the other part to couple the parts together when the sleeves are rotated to position the shields for uncovering the passages.

2. A coupling comprising a passaged part, a sleeve rotatably mounted on said part having a shield covering the passage in said part in one position thereof and uncovering the passage in another position thereof, said sleeve having circumferentially spaced fingers projecting beyond said part, inturned flanges on said fingers, a second passaged part having circumferentially spaced outturned lugs on an end thereof, a second sleeve rotatably mounted on said second part having a shield covering the passage in said second part in one position thereof and uncovering said passage in another position thereof, said second sleeve having circumferentially spaced recesses for receiving the fingers of said first mentioned sleeve, and said lugs of the second part arranged to enter the recesses upon relative rotation of the second sleeve and second part for engaging the inturned flanges on the fingers to couple the parts together.

3. A coupling comprising a pair of passaged nipples having circumferentially spaced lugs therearound, a pair of interfitting sleeves rotatably mounted on said nipples and having shield walls across the end faces of the nipples to seal the passages therein in one position thereof and to join the passages in another position thereof, and means on a sleeve engaging said outturned lugs whenever the sleeves are moved to join the passages for coupling the nipples together.

4. A quick-disconnect coupling comprising a pair of hollow nipples arranged to be attached to conduit ends, a sleeve rotatably mounted on each nipple having an apertured shield wall extending across an end face of the nipple to seal the nipple whenever the conduits are disconnected, and said sleeves having interlocking fingers and recesses to cause the same to rotate together as a unit and said unit having means engaging the nipples to detachably connect the same whenever the shields are moved to join the passages in the nipples.

5. A coupling comprising a pair of passaged parts adapted to be connected to conduit ends, said parts having end faces in which the passages terminate, a sleeve rotatably mounted on each part having a shield wall overlying the end face of the part, said shield walls cooperating to define a conduit section adapted to be aligned with the passages in the parts for joining said passages when the parts are coupled together, said shield walls being rotatable over said end faces to close the passages when the parts are uncoupled, and locking instrumentalities for detachably uniting the parts.

6. A coupling comprising a pair of longitudinally passaged cylindrical headed nipples having end head faces and threaded shanks, the passages extending through said shanks and heads to terminate in the end head faces in eccentric relation to the cylindrical heads, a pair of cup-shaped members each having side walls rotatable on said cylindrical heads and apertured end walls covering said end head faces, the apertures in said end walls being movable into and out of alignment with the terminal ends of the passages, and locking instrumentalities joining the cup-shaped members together with the apertures in alignment for detachably connecting the nipples, whereby the cup members can be alternately rotated on the nipples to align the apertures with the nipple passages for joining the nipples in fluid flow communication and to misalign the apertures with the passages for sealing the passages.

7. A coupling comprising a pair of passaged nipples adapted for connection to conduit ends, a female cup member rotatable on one nipple, a male cup member rotatable on the other nipple, said cup members having apertured shield walls covering the end faces of the nipples to seal the passages when the cup members are rotated to misalign the apertures with the passages, said male and female cup members fitting together to align the apertures in the shield walls thereof, whereby the cup members can be rotated as a unit to move the aligned apertures into alignment with the passages for joining the passages, and cooperating locking instrumentalities for holding the cup members together whenever the unit is rotated to join the passages.

8. A coupling comprising a first passaged nipple, a female sleeve having an apertured end wall to cover an end face of the first nipple, cooperating lugs on the first nipple and female sleeve to hold the sleeve on the nipple in rotatable relation thereto, a second passaged nipple, a male sleeve having an apertured end wall to cover an end face of the second nipple, cooperating lugs on the second nipple and male sleeve to hold the male sleeve in the second nipple in rotatable relation thereto, said lugs of the nipples and sleeves being circumferentially spaced to allow assembly of the sleeves on their respective nipples, said male and female sleeves fitting together to form a coupling unit with the apertures in the end walls of the sleeves in alignment and said male sleeve having additional lugs thereon engageable with the lugs of the first nipple to hold the nipples together whenever the unit is rotated to move the apertures into alignment with the nipple passages.

9. In a coupling having passaged coupling parts with end faces in which the passages terminate, the improvement of a connecting unit to alternately couple the parts in fluid flow communication and seal the parts in uncoupled relation which comprises a pair of members each having a side wall portion rotatably carried by a coupling part, an end wall portion across the end face of a coupling part to cover and uncover the passage of the part and interfitting portions joining both members for rotation as a unit, and means on a member engageable with a coupling part other than the part rotatably carrying the member for detachably connecting the parts when the unit is rotated to position the end walls thereof for uncovering the passageways in the parts.

10. A coupling for sealing disconnected conduit ends and for joining the conduits in fluid flow communication which comprises a pair of passaged nipples having end faces in which the passages terminate, a shield for each nipple having a side wall rotatably mounted on the nipple and an end wall across the end face of the nipple for alternately covering and uncovering the nipple passage, interfitting means on each shield for coaxially aligning the nipples while joining the shields for rotation as a unit, and means on a shield for detachably engaging a nipple other than the nipple on which the shield is rotatably mounted whenever the unit is rotated to uncover the passages of the nipples for joining the same in fluid flow communication.

ARTHUR TOWNHILL.